United States Patent [19]
Yokokura

[11] 3,885,798
[45] May 27, 1975

[54] DRIVE ASSEMBLY FOR PHONOGRAPH RECORD PLAYER

[75] Inventor: Kunio Yokokura, Yokohama, Japan

[73] Assignee: Sony Corporation, Tokyo, Japan

[22] Filed: Mar. 25, 1974

[21] Appl. No.: 454,776

[30] Foreign Application Priority Data

Mar. 29, 1973 Japan .............................. 48-38065

[52] U.S. Cl. ............. 274/10 R; 274/1 E; 274/39 A
[51] Int. Cl. ......................... G11b 17/06; G11b 3/60
[58] Field of Search ....... 274/1 E, 10 R, 10 S, 10 D, 274/10 C, 39 R, 39 A, 9 R

[56] References Cited

UNITED STATES PATENTS

| | | | |
|---|---|---|---|
| 1,259,561 | 3/1918 | Russ | 274/39 R |
| 2,032,062 | 2/1936 | Lichter | 274/39 R |
| 2,118,347 | 5/1930 | Hardenberg | 274/1 E |
| 2,490,667 | 12/1949 | Boyd | 274/39 A |
| 3,297,327 | 1/1967 | Hansen | 274/10 R |
| 3,519,276 | 7/1970 | Warner | 274/39 R |
| 3,820,797 | 6/1974 | Suzuki | 274/10 S |

*Primary Examiner*—Richard E. Aegerter
*Assistant Examiner*—A. J. Mirabito
*Attorney, Agent, or Firm*—Lewis H. Eslinger; Alvin Sinderbrand

[57] ABSTRACT

In a phonograph record player having a turntable rotatably mounted on a frame for supporting a phonograph record during the playing thereof, and a function control mechanism driven by rotation of the turntable in response to actuation of the control mechanism, for example, for automatically returning a tone arm to its rest position at the completion of the playing of a record; there is provided a turntable drive mechanism or assembly comprised of an electric motor, a first transmission, for example, of the belt and pulley type, connecting the motor with the turntable for rotating the latter during the playing of a record while isolating the turntable from vibrations of the motor, and a second transmission, for example, constituted by an idler wheel engageable with a drive wheel or capstan on the motor shaft and with the turntable, and which is made operative for rotating the turntable only upon actuation of the function control mechanism so as to prevent stalling or slowing of the rotation of the turntable when the latter drives, and is additionally loaded by the function control mechanism.

14 Claims, 9 Drawing Figures

DRIVE ASSEMBLY FOR PHONOGRAPH RECORD PLAYER

BACKGROUND OF THE INVENTION

1. Field of the Invention

This invention relates generally to a phonograph record player, and more particularly is directed to an improved turntable drive assembly or mechanism for a phonograph record player of the type having an automatic function control mechanism, for example, by which the tone arm thereof is automatically lifted and returned to its rest position when the tracking of the final non-recorded groove portion of the record by the pickup stylus is detected.

2. Description of the Prior Art

In many existing phonograph record players, automatic function control mechanisms, for example, mechanisms for automatically returning a tone arm to its rest position at the completion of the playing of a phonograph record and/or for record changing, are driven from the turntable when such automatic function control mechanisms are made operative by selective actuation thereof, for example, as in U.S. Pat. No. 3,288,471. Such automatic tone arm return and/or record changing mechanisms require a relatively large torque for their operation, and thus impose a relatively large resistance to rotation of the turntable when being driven by the latter.

Further, in existing phonograph record players, either a belt drive or an idler drive is usually provided for rotating the turntable from an electric motor. In the case of a belt drive for the turntable, a flexible, elastic belt, for example, of rubber, runs around a suitable pulley secured on the motor shaft and around a circular flange provided on the turntable so that vibrations of the electric motor will be absorbed by the belt and not transmitted to the turntable, whereby the latter is smoothly rotated to avoid so-called "rumble" in the reproduced sounds and to obtain the latter with a good S/N ratio. However, when the resistance to rotation of the turntable is increased, for example, when an automatic tone arm return mechanism and/or a record changing mechanism is driven by the turntable, the flexible, elastic belt stretches and slips relative to the driving pulley and/or the turntable with the result that the rotary movement of the turntable is slowed or even stalled and the operation of the tone arm return mechanism and/or the record changing mechanism may not be completed.

The above disadvantage of a belt drive for the turntable is avoided by the idler drive in which an idler wheel is engaged simultaneously with a drive wheel or capstan on the motor shaft and with a flange or rim on the turntable so as to be capable of transmitting a relatively large torque to the latter. However, in the case of an idler drive for the turntable, vibrations occurring in the motor are directly transmitted through the idler wheel to the turntable. Furthermore, after prolonged usage, the periphery of the idler wheel may be deformed or develop a flat area with the result that a rumble occurs in the reproduced sound and the latter is not obtained with a good S/N ratio.

It has further been proposed, for example, in U.s. Patent application Ser. No. 191,765, filed Oct. 22, 1971 and now U.S. Pat. No. 3,820,797, issued June 28, 1974, and having a common assignee herewith, to provide a phonograph record player with a first motor for driving the turntable through either a belt drive or an idler drive, and with a second motor by which a tone arm return mechanism and/or a record changing mechanism is driven independently of the drive of the turntable. However, such an arrangement is relatively complex and the use of two relatively expensive electric motors makes it costly.

SUMMARY OF THE INVENTION

Accordingly, it is an object of the present invention to provide a turntable drive for a phonograph record player which avoids the above mentioned disadvantages of the existing turntable drives, particularly when the phonograph record player is provided with an automatic function control mechanism driven by the turntable, for example, for returning a tone arm to a rest position and/or for changing records.

More specifically, it is an object of this invention to provide a turntable drive which, during the playing of a phonograph record, effectively isolates the turntable from vibrations of the motor so that sound is reproduced with a good S/N ratio, and which, during the driving of an automatic function control mechanism by the turntable, for example, for either returning the tone arm to its rest position or changing records, is effective to avoid slippage in the turntable drive even though rotation of the turntable is relatively strongly resisted by the automatic function control mechanism driven therefrom.

Another object is to provide a turntable drive, as aforesaid, which is relatively simple and inexpensive, while being reliable in operation.

In accordance with an aspect of this invention, a phonograph record player having a rotatable turntable for supporting a phonograph record during the playing thereof, and a function control mechanism which, when actuated, is driven by rotation of the turntable, for example, for automatically returning a tone arm to its rest position at the completion of the playing of a record, and/or for changing records, is provided with a turntable drive assembly comprised of an electric motor, a first transmission, for example, of the belt and pulley type, connecting the motor with the turntable for rotating the latter during the playing of a record while isolating the turntable from vibrations of the motor, and a second transmission, for example, constituted by an idler wheel engageable with a drive wheel or capstan on the motor shaft and with the turntable, and which is made operative for rotating the turntable only upon actuation of the associated function control mechanism so as to prevent stalling or slowing of the rotation of the turntable when the latter drives, and is additionally loaded by the function control mechanism.

The above, and the other objects, features and advantages of this invention, will be apparent in the following detailed description of illustrative embodiments thereof which is to be read in connection with the accompanying drawings.

DESCRIPTION OF THE PREFERRED EMBODIMENTS

Figure 1:
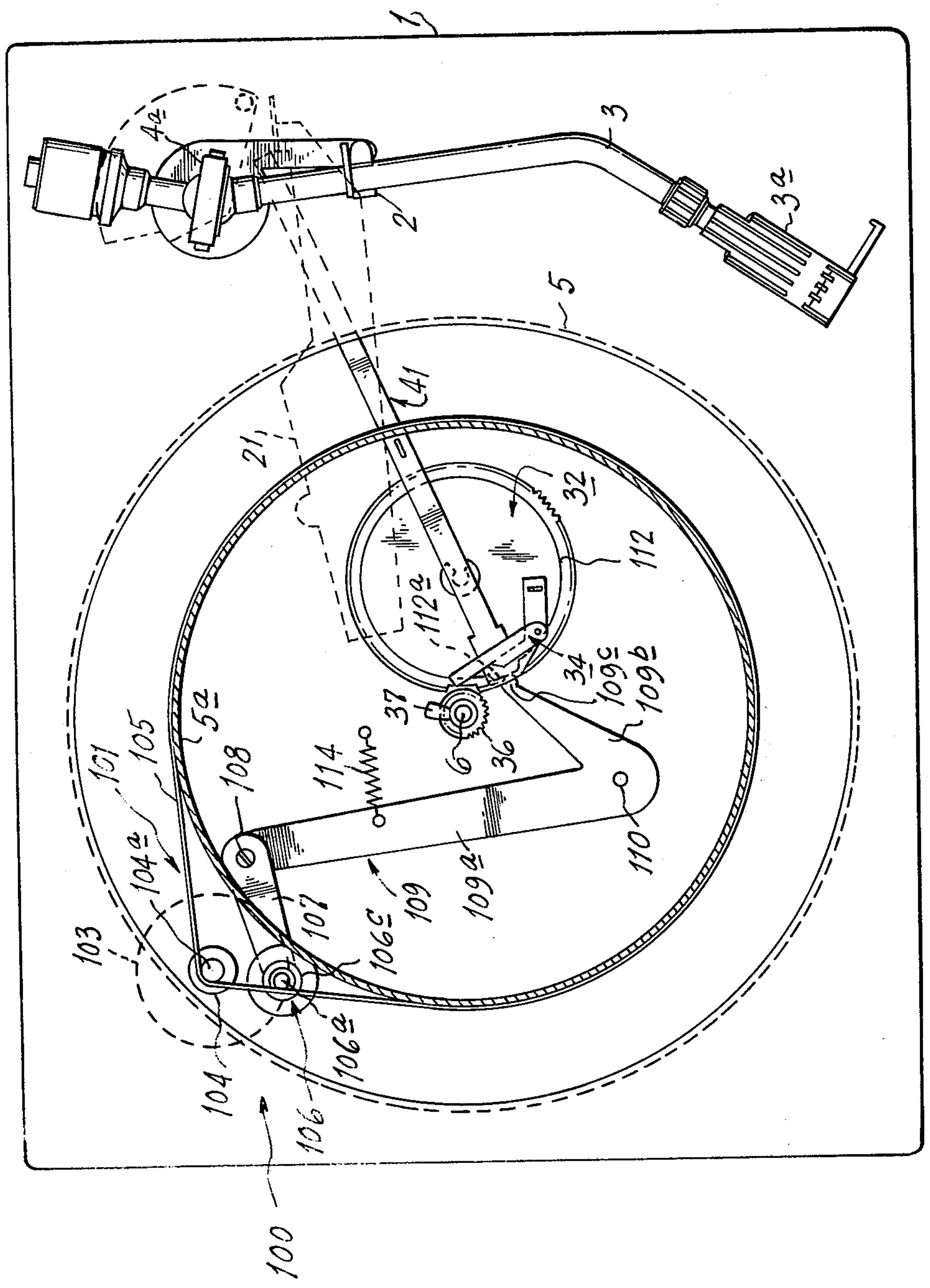
FIG. 1 is a top plan view of a phonograph record player having a turntable drive assembly or mechanism according to this invention, and being shown with the turntable removed and with its tone arm in the rest position thereof prior to the playing of a record.
Figure 2:
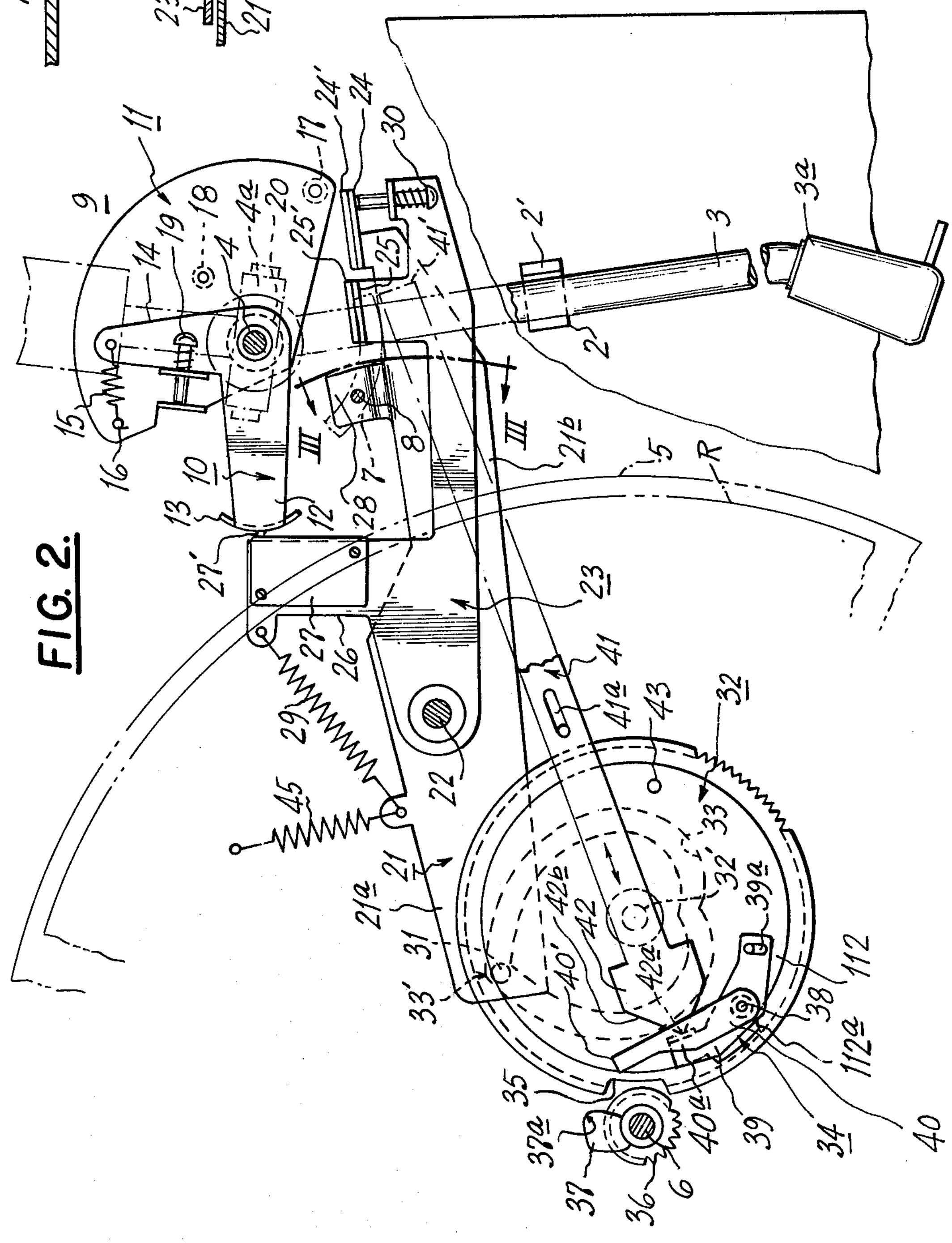
FIG. 2 is an enlarged top plan view of an automatic function control mechanism which is adapted to be associated with the turntable drive assembly according to this invention in the phonograph record player of FIG. 1, and which is shown in its initial or starting condition.

Referring to the drawings in detail, and initially to FIGS. 1 and 2 thereof in which only those parts of a phonograph record player necessary to an understanding of this invention are illustrated, it will be seen that such phonograph record player generally comprises a frame 1 having an arm rest or support 2 thereon for supporting a tone arm 3 in an elevated rest position outside the perimeter of a turntable 5 (shown in broken lines) which is rotatable above frame 1 on a driving shaft or spindle 6 suitably journalled in bearings (not shown) carried by the frame. The tone arm 3 is mounted adjacent one end, as by a gimbal 4*a*, on a vertical rotatable shaft 4 supported in bearings carried by frame 1 so that the tone arm 3, carrying a conventional pickup 3*a* at its free end, is capable of lateral swinging movement across turntable 5 and also capable of being raised and lowered relative to the turntable between the elevated rest position outside the perimeter of the turntable, as shown on FIGS. 1 and 2, and an inner position indicated in broken lines at 3′ on FIG. 4 and which corresponds to the engagement of the stylus (not shown) of pickup 3*a* in the conventional final non-recorded groove portion of a record R (FIG. 2) on turntable 5. The turntable 5 is adapted to be driven by a turntable drive mechanism or assembly 100 powered by an electric motor 103 and which, in accordance with this invention, includes transmission means for connecting motor 103 with turntable 5, as hereinafter described in detail.

The drive assembly 100 according to this invention is associated with a phonograph record player of the type having an automatic function control mechanism 9 (FIG. 2) which, for example, may be operative to return tone arm 3 to its elevated rest position upon the completion of the playing of a phonograph record.

Figure 3:
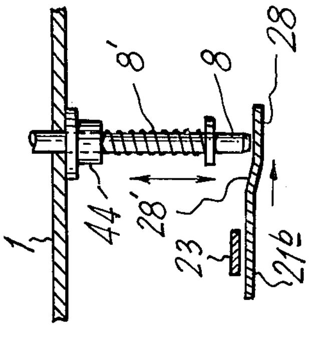
FIG. 3 is a detail sectional view taken along the line III—III on FIG. 2.

The illustrated function control mechanism 9 is of the type disclosed in detail in U.S. Patent application Ser. No. 425,831, filed Dec. 18, 1973, and having a common assignee herewith, and is shown to include an arcuate arm lifter 7, appearing in broken lines on FIG. 2, which extends under tone arm 3 in all positions of the latter and is mounted on the upper end of a vertically movable shaft 8 slidable in a bearing 44 carried by frame 1 and urged downwardly by a helical spring 8′ (FIG. 3). Further, as shown on FIG. 2, the rotatable support shaft 4 to which tone arm 3 is coupled has a bellcrank 10 fixed thereto below frame 1 and a drive member 11, for example, in the form of the illustrated sector-shaped plate, mounted on shaft 4 below bellcrank 10 and being free to turn relative thereto. The bellcrank 10 includes lever arms 12 and 14 extending substantially at right angles to each other, and an arcuate flange 13 depends from the end of lever arm 12 to form a switch operating member. A spring 15 is connected between the end of lever arm 14 and an anchor pin 16 on drive member 11 so as to yieldably urge shaft 4 and bellcrank 10 to turn with drive member 11 in a position relative to the latter in which a stop screw 19 adjustably carried by lever arm 14 engages against a lug 11*a* on drive member 11, as shown. A relatively short pin or roller 17 for actuating a detecting device, as hereinafter describd in detail, depends from sector-shaped drive member 11 adjacent the outer end of the radial edge of the latter which is substantially diametrically opposed to lever arm 12 of bellcrank 10 in the normal spring-urged relative position of bellcrank 10 and drive member 11. Another relatively longer pin or roller 18 depends from the central portion of sector-shaped drive member 11 and, as hereinafter described, is adapted to transmit rotary torque to drive member 11 during that period of operation of control mechanism 9 when tone arm 3 is being returned to its rest position on support 2. An annular member 20 constituting a brake band or collar is fixed on shaft 4 below drive member 11 and is frictionally engaged, as hereinafter described, for resisting the turning of shaft 4 and bellcrank 10 with drive member 11 during the return movement of tone arm 3 to its rest position.

Figures 5, 6:
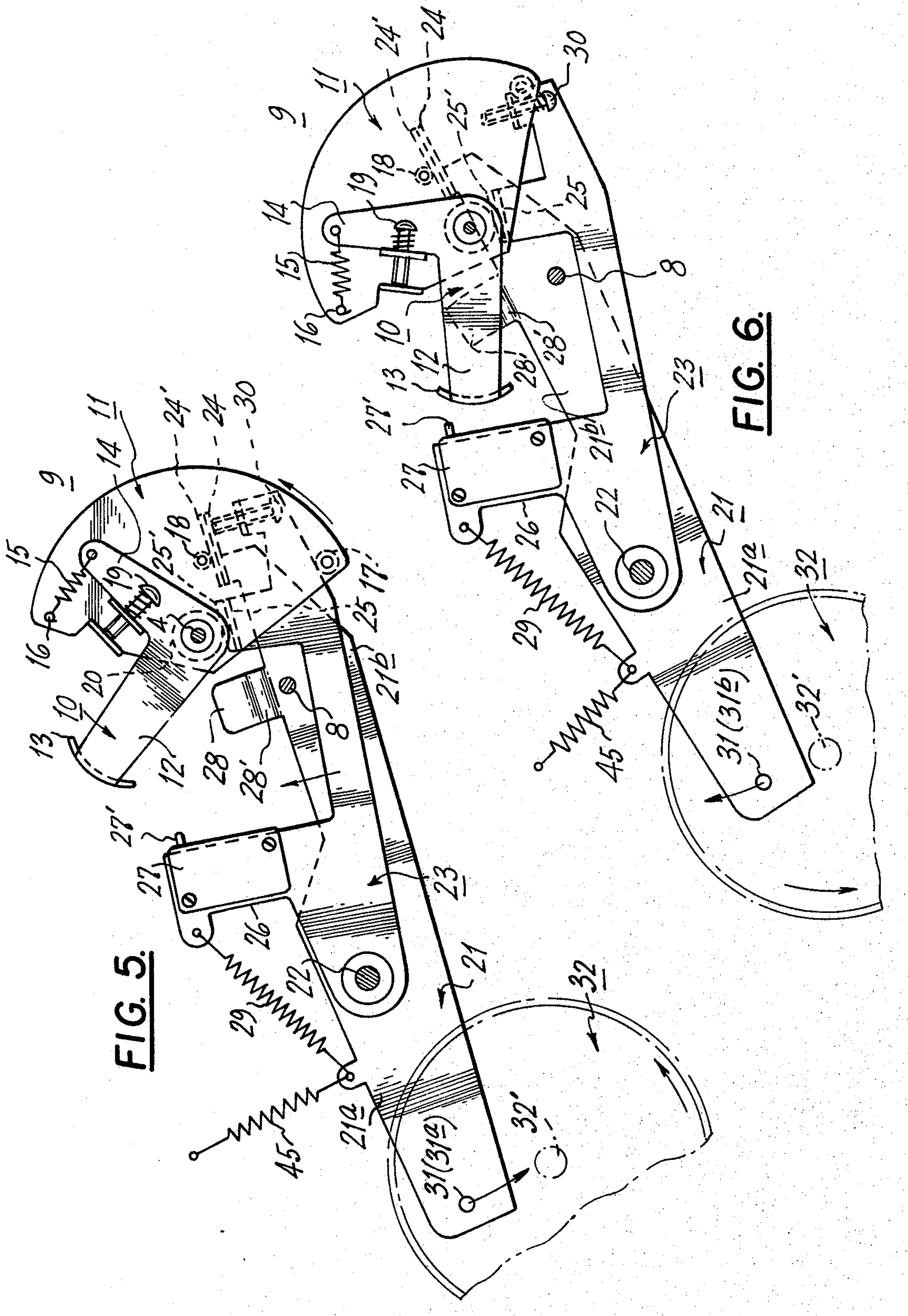
FIG. 5 is another view similar to that of FIG. 2, but showing the condition of the automatic function control mechanism at the commencement of the return movement of the tone arm toward its rest position.
FIG. 6 is still another view similar to that of FIG. 2 but showing the condition of the automatic function control mechanism upon the completion of the return movement of the tone arm to its rest position.

The function control mechanism 9 is further shown to include a main lever 21 pivoted, intermediate its ends, on a pivot pin 22 depending from frame 1 so as to be turnable between a starting position (FIG. 2) and a displaced position (FIG. 6). Main lever 21 is shown to extend generally laterally and to include substantially opposed arms 21*a* and 21*b* which respectively extend toward the axis of turntable 5 and toward drive member 11 in front of shaft 4 at a level below the relatively short pin 17 depending from drive member 11. Arm 21*b* of main lever 21 is longitudinally dimensioned so that an upstanding flange 24 extending from its free end portion and faced with a pad 24′ will be engageable against pin 18 depending from drive member 11 upon turning of main lever 21 from its starting position to its displaced position, as hereinafter described in detail. A lever arm 23 is pivotally mounted, at one end, on pivot pin 22 above main lever 21 and generally overlies arm 21*b* of the main lever. Lever arm 23 is formed with an upstanding flange 25 adjacent its free end, and such flange 25 is faced with a pad or brake shoe 25′ which is engageable with brake band 20 secured on shaft 4 during the turning of main lever 21 from its starting position to its displaced position for frictionally resisting, and thereby slowing the return movement of tone arm 3 to its rest position, as hereinafter described. Lever arm 23 has a rearwardly directed extension 26, and a spring 29 is connected between extension 26 and main lever 21 at which a stop screw 30 adjustably carried by the free end of lever arm 23 engages against flange 24 at the free end of arm 21*b*.

A microswitch 27 is mounted on extension 26 of lever arm 23 and is provided with a switch actuator 27′ engageable by switch operating member 13 on bell-crank 10 only when tone arm 3 is in its rest position and lever arm 23 is in its normal position relative to main lever 21 in the starting position of the latter, as shown on FIG. 2. Switch 27 is suitably interposed in the energizing circuit of drive motor 103 for turntable 5 and has ON and OFF conditions for rendering drive motor 103 operative and inoperative, respectively. The actuator 27′ of switch 27 is conventionally urged to project from the switch housing, as on FIGS. 4–6, for establishing the ON condition of switch 27, and the OFF condition of the switch is established only when switch actuator 27′ is depressed or retracted as a result of its engagement by switch operating member 13.

Arm 21*b* of main lever 21 is further shown to have a rearwardly directed extension 28 which, as shown on FIG. 3, is at a lower level than the remainder of arm 21*b* and is connected to the latter by an inclined ramp portion 28′. With main lever 21 in its starting position, as shown on FIGS. 2 and 3, extension 28 of arm 21*b* extends under the bottom end of rod 8 which is urged downwardly by spring 8′ against extension 28 so as to dispose arm lifter 7 at a relatively low position. With arm lifter 7 in such relatively low position, tone arm 3 can be manually removed from its rest position on support 2 and lowered to engage the stylus of pickup 3*a* with the groove of record R adjacent the periphery of the latter. However, when main lever 21 is turned from its starting position toward its displaced position, as hereinafter described, extension 28 of arm 21*b* is moved rearwardly from under rod 8 so that the latter is successively engaged by the inclined ramp portion 28′ and then by the arm 21*b* (FIGS. 4 and 5) which is at a relatively high level and thus moves rod 8 upwardly against the force of spring 8′ for causing arm lifter 7 to raise tone arm 3 to the level of its rest position and thereby disengage the pickup stylus from the record.

The automatic function control mechanism 9 for association with the drive assembly 100 according to this invention is further shown to include a rotatable control member in the form of a gear 32 rotatable on a shaft 32′ depending from frame 1 and located so that the periphery of gear 32 is adjacent turntable drive shaft 6. The underside of gear 32 is formed with a cam groove 33 in which there engages or rides a cam follower pin 31 directed upwardly from the free end of arm 21*a* of main lever 21. Cam groove 33 may be heart-shaped, as shown, or otherwise provided with a cusp 33′ which is engaged by pin 31 in an initial position of gear 32 for establishing the starting position of main lever 21, as shown on FIG. 2. The control gear 32 is shown to have a gap or recess 35 in its peripheral teeth, which gap, in the initial position of gear 32, faces toward a pinion 36 fixed on turntable drive shaft 6 so that pinion 36 can rotate with turntable 5 independently of control gear 32. In order to initiate rotation of control gear 32 from its initial position, a clutch device 34 is mounted on gear 32 and, in the engaged condition of clutch device 34, a drive member 37 extending radially from shaft 6 and rotatable therewith above pinion 36 acts against cluth device 34 so as to angularly displace gear 32 to an extent sufficient to bring the peripheral teeth of gear 32 into meshing engagement with pinion 36.

The clutch device 34 is shown to include a clutch element 39 pivoted on a pin 38 projecting from the under surface of gear 32 for angular displacement in respect to the latter, which angular displacement is limited, as by a pin and slot connection 39*a*. Element 39 frictionally contacts the upper surface of gear 32 so as to tend to remain in any position relative to gear 32 to which elment 39 is forcibly displaced. Clutch device 34 further includes a clutch arm 40 pivoted, at one end, on pin 38 above clutch element 39 and extending from pivot pin 38 to the vicinity of gap 35 in the teeth of gear 32. Clutch arm 40 frictionally engages the upper surface of clutch element 39 so as to tend to move angularly with the latter. In the disengaged condition of clutch device 34, the free end 40′ of clutch arm 40 is outside the orbit or path of movement of drive member 37 on shaft 36 so that drive member 37 may rotate with shaft 6 without acting on clutch device 34. However, when clutch device 34 is shifted to its engaged condition, as shown on FIG. 4, the free end 40′ of clutch arm 40 is projected into the orbit or path of drive member 37 so that the latter acts against end 40′ of clutch 40 for initiating the rotation of gear 32 from its initial position. The return of clutch device 34 to its disengaged condition is effected as gear 32 nears its initial position in the course of a full revolution of such gear. More specifically, as gear 32 nears its initial position, an arcuate edge 37*a* on drive member 37 acts against an oblique portion 40*a* of the outer edge of clutch arm 40 to return the latter and also element 39, to the positions shown on FIG. 2 from the positions shown on FIG. 4.

Figure 4:
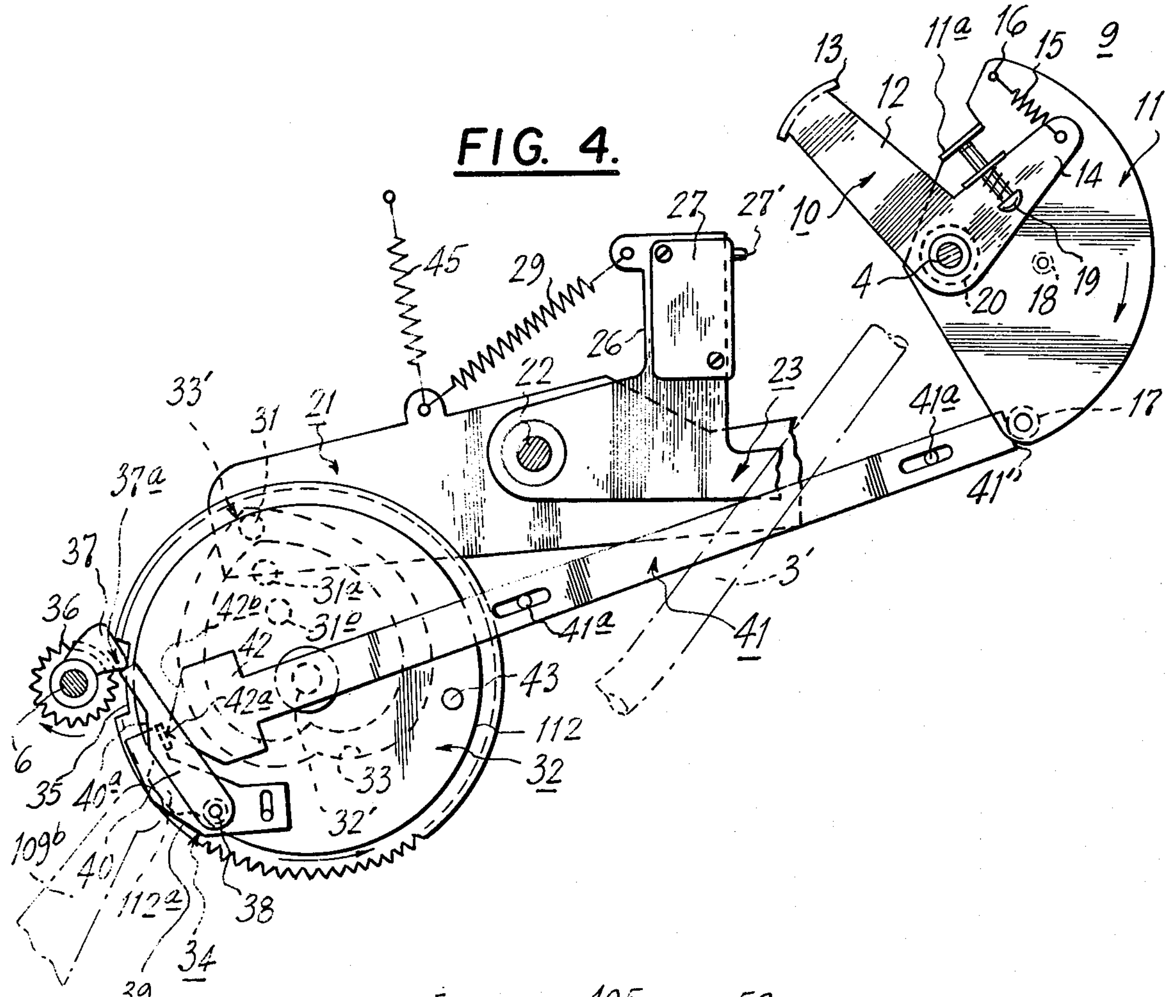
FIG. 4 is a view similar to that of FIG. 2, but showing the condition of the automatic function control mechanism at the moment when the detecting device thereof detects the tracking of the final non-recorded groove portion of a phonograph record.

The clutch device 34 may be shifted from its disengaged condition to its engaged condition upon operation of an actuating or detecting device in response to the arrival of the tone arm at its inner position indicated at 3′ on FIG. 4 and which corresponds to the tracking by the stylus of pickup 3*a* of the final nonrecorded groove portion of record R. In the illustrated function control mechanism 9, the actuating or detecting device is shown to include an elongated rod 41 which is mounted under frame 1, as by pin and slot connections 41*a*, so as to be longitudinally reciprocable in a path that extends generally from the location of pin 17 on drive member 11 when the tone arm is in its inner position 3′ to adjacent element 39 of clutch device 34. The end of rod 41 adjacent clutch device 34 is shown to be formed with an enlarged head 42 having a V-shaped end edge defining an apex 42*a* engageable with clutch element 39 and converging flanks 42*b* leading to apex 42*a*. It will be apparent that, when the tone arm is moved to its inner position 3′, pin 17 depending from drive member 11 acts against the adjacent end 41′ of rod 41 to displace the latter toward the left, as viewed on FIG. 4, and thereby to cause the apex 42*a* of head 42 to act against clutch element 39 for angularly displacing the latter in the counterclockwise direction about pivot pin 38. By reason of the frictional engagement of clutch arm 40 with clutch element 39, clutch arm 40 is similarly displaced in the counterclockwise direction to project its free end 40′ into the path of drive member 37. In order to return the detecting rod 41 to the position shown on FIG. 2. from the position shown on FIG. 4, a pin 43 extends upwardly from control gear 32 and is movable in a circular path with gear 32 so as to ride along one of the flanks 42*b* of head 42 and thereby displace rod 41 toward the right, as viewed on the drawings.

Finally, a spring 45 is connected between main lever 21 and frame 1 so as to urge lever 21 in the clockwise direction about pivot pin 22, that is, in the direction urging cam follower pin 31 radially away from the center of gear 32. Thus, when control gear 32 is in its initial position, as shown on FIG. 2, cam follower pin 31 is engaged into cusp 33′ of cam groove 33 to resist inadvertent displacement of gear 32 from its initial position at which gap 35 faces pinion 36. By reason of the foregoing, rotation of control gear 32 from its initial position can only occur in response to the previously described displacement of detecting rod 41 for shifting clutch device 34 to its engaged condition.

A phonograph record player provided with the above described automatic function control mechanism 9 operates as follows:

Starting with the various component parts of the record player in the positions shown on FIG. 2, the operation of the phonograph record player is initiated by manually removing tone arm 3 from its rest position on support 2 and swinging tone arm 3 inwardly, that is, in the clockwise direction about shaft 4, and lowering the tone arm so as to engage the stylus of pickup 3*a* in the groove of the record R adjacent the periphery of the latter. In the course of such movement of tone arm 3, bellcrank 10 turns in the clockwise direction with shaft 4 so as to disengage switch operating member 13 from the actuator 27′ of switch 27, and thereby to establish the ON condition of switch 27 for effecting operation of drive motor 103. Thus, turntable 5 is rotated with the record R thereon. During the rotation of record R on turntable 5, the stylus of pickup 3*a* tracks the spiral groove of the record in which sounds are recorded so that pickup 3*a* progressively moves toward the center of the record and tone arm 3 progressively swings in the clockwise direction about the axis of shaft 4. Bellcrank 10 turns with shaft 4 as a result of such swinging of tone arm 3 and, through spring 15, drive member 11 is made to follow the turning of bellcrank 10.

Upon the completiom of the playing of the record R, the stylus of pickup 3*a* engages the conventional final non-recorded groove portion near the center of the record and tone arm 3 arrives at its corresponding inner portion indicated at 3′ on FIG. 4. The arrival of tone arm 3 at its inner position 3′ brings drive member 11 to the position shown on FIG. 4 at which pin 17 acts agasint the adjacent end 41′ of detecting rod 41 for shifting the latter toward the left, as viewed on the drawing, and thereby causing the apex 42*a* of head 42 to angularly displace clutch element 39 in the counterclockwise direction about pin 38 and to similarly angularly displace clutch arm 40. Thus, clutch device 34 is shifted to its engaged condition (FIG. 4) in which the end 40′ of clutch arm 40 is engaged by drive member 37 on rotated shaft 6, and gear member 32 is angularly displaced from its initial position for bringing its peripheral teeth into meshing engagement with rotated pinion 36. Thereafter, gear 32 is turned in the counterclockwise direction by rotated pinion 36 and, by reason of the heart-shaped configuration of cam groove 33, cam follower pin 31 is moved progressively inward toward the center of gear 32 through the position 31*a* (FIG. 5) to the position 31*b* (FIG. 6) which pin 31 attains at approximately the completion of one-half revolution of gear 32 from its initial position. Such movement of cam follower pin 31 turns main lever 21 in the counterclockwise direction from its starting position shown on FIG. 2 so that pads 24′ and 25′ on flanges 24 and 25 of lever 21 and lever 23 are moved rearwardly toward pin 18 on drive member 11 and brake band 20 on shaft 4, respectively. In the course of the turning of main lever 21 from the starting position of FIG. 2 to the position shown on FIG. 5, arm 21*b* of main lever 21 is moved under rod or shaft 8 so as to elevate the latter and thereby cause arm lifter 7 to raise tone arm 3 for disengaging the stylus of pickup 3*a* from the record. As main lever 21 arrives at the position shown on FIG. 5, pad 24′ on flange 24 of lever 21 and pad or brake shoe 25′ on flange 25 of lever arm 23 substantially simultaneously come into engagement with pin 18 and brake band 20, respectively. Thereafter, during further counterclockwise turning of main lever 21 to its displaced position shown on FIG. 5, pad 24′ on flange 24 of lever 21 moves rearwardly against pin 18 for turning drive member 11 in the counterclockwise direction from the position shown on FIGS. 4 and 5 to the position shown on FIG. 6. During the further turning of main lever 21 from the position shown on FIG. 5 to the position shown on FIG. 6, lever arm 23 cannot participate in such turning of the main lever 21 by reason of the engagement of the brake shoe 25′ with brake band 20. Thus, during the described counterclockwise turning of the drive member 11 to the position shown on FIG. 6, lever member 23 is angularly displaced against the force of spring 29 away from its normal position relative to main lever 21. Of course, during such angular displacement of lever arm 23 from its normal position relative to main lever 21, spring 29 holds brake shoe 29′ firmly against brake band 20 on shaft 4 so that the turning of shaft 4, bellcrank 10 and tone arm 3 with drive member 11 is frictionally resisted. By reason of the foregoing frictional resistance or braking force, the turning of bellcrank 10, shaft 4 and tone arm 3 in the counterclockwise direction lags or is slowed relative to the turning of drive member 11 from the position of FIG. 5 to the position of FIG. 6 and spring 15 is extended or loaded. Therefore, during movement of drive member 11 to the position of FIG. 5, tone arm 3 is relatively slowly swung outwardly while being raised by arm lifter 7 and is returned to its rest position on support 2 where the previously described loading of spring 15 ensures the smooth and soft engagement of the tone arm with the stop 2′ provided at the outer side of the support or rest 2.

It will be noted that the above described return of tone arm 3 to its rest position occurs relatively slowly during one-half-revolution of gear 32, and that, at the completion of such half-revolution of gear 32, bellcrank 10 and the switch operating member 13 thereon are restored to their original positions. However, as shown on FIG. 6, the restoration of switch operating member 13 to its original position does not result in its engagement with switch actuator 27′ by reason of the fact that main lever 21 is displaced from its starting position and lever arm 23 carrying switch 27 on its extension 26 is displaced from its normal position relative to main lever 21. Thus, switch 27 continues in its ON condition so that motor 103 continues to operate to drive turntable 5 and, through the pinion 36 on shaft 6, to drive control gear 32. As the rotation of gear 32 is continued, pin 43 thereon acts against flank 42b on the head 42 of detecting rod 41 for displacing the latter toward the right to the position shown on FIG. 2.

During the second half-revolution of control gear 32, cam follower pin 31 is moved radially outward in respect to the center of gear 32 from the position 31b (FIG. 6) toward the position shown on FIG. 2 so as to turn main lever 21 in the clockwise direction toward its starting position, and further to permit spring 29 to restore lever arm 23 to its original position relative to main lever 21. As gear 32 nears the completion of the full revolution, arcuate edge surface 37a on drive member 37 acts against edge portion 40a of clutch arm 40 for angularly displacing the latter in the counterclockwise direction about pin 38 and for similarly angularly displacing clutch element 39 in frictional contact with arm 40, whereby clutch device 34 is restored to its disengaged condition. Finally, upon the return of control gear 32 to its initial position (FIG. 2) actuator 27' of switch 27 is engaged by switch operating member 13 for establishing the OFF condition of switch 27 and thereby halting the operation of drive motor 103. The force of spring 45 on main lever 21 and the consequent engagement of cam follower pin 31 in cusp 33' of cam groove 33 ensures that, upon the halting of operation of drive motor 103 with gear 32 restored to its initial position, inertia will not cause control gear 32 to move past the initial position in which gap 35 of its teeth again faces pinion 36.

It will be apparent that, during the operation of the above described automatic function control mechanism 9, the latter imposes substantial resistance to the rotation of turntable 5 from which control gear 32 of mechanism 9 is driven. Such resistance to rotation of turntable 5 is particularly large during the return swinging movement of tone arm 3 from its inner position (FIG. 4) to its rest position (FIG. 6) by reason of the braking force then applied by brake shoe 29' against brake band 20 for slowing the return of tone arm 3 to its rest position. If the drive assembly 100 for driving torntable 5 from motor 103 permits relative slippage, there is the danger that, when the automatic function control mechanism 9 imposes a relatively large resistance to rotation of turntable 5, as described above, such relative slippage may occur to stall the driving of turntable 5 with the result that gear 32 will not turn through a complete revolution or return to its initial position for returning tone arm 3 to its rest position and/or restoring function control mechanism 9 to its initial condition in which motor 103 is rendered inoperative.

Thus, it is desirable that, during the driving of function control mechanism 9 from turntable 5, the drive mechanism or assembly 100 should provide a relatively non-slip transmission between motor 103 and turntable 5. Further, during the playing of a phonograph record, it is desirable that the drive mechanism or assembly 100 transmit rotational movement from motor 103 to turntable 5 in such a way as to isolate the turntable from any vibration occurring in motor 103, whereby to avoid so-called rumble in the reproduced sounds and to obtain the latter with a good S/N ratio.

Figure 7:
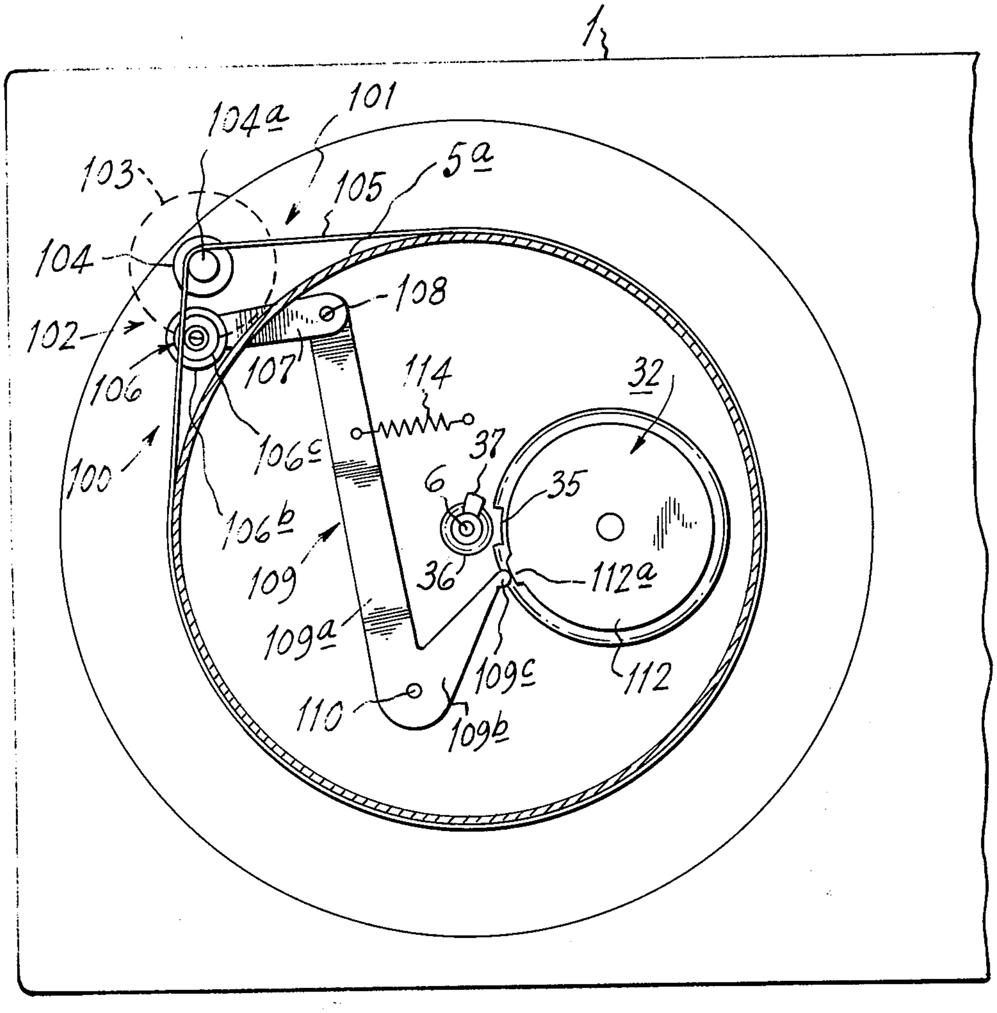
FIG. 7 is a view similar to that of FIG. 1, but showing only the turntable drive assembly in its condition during playing of a phonograph record.
Figure 8:
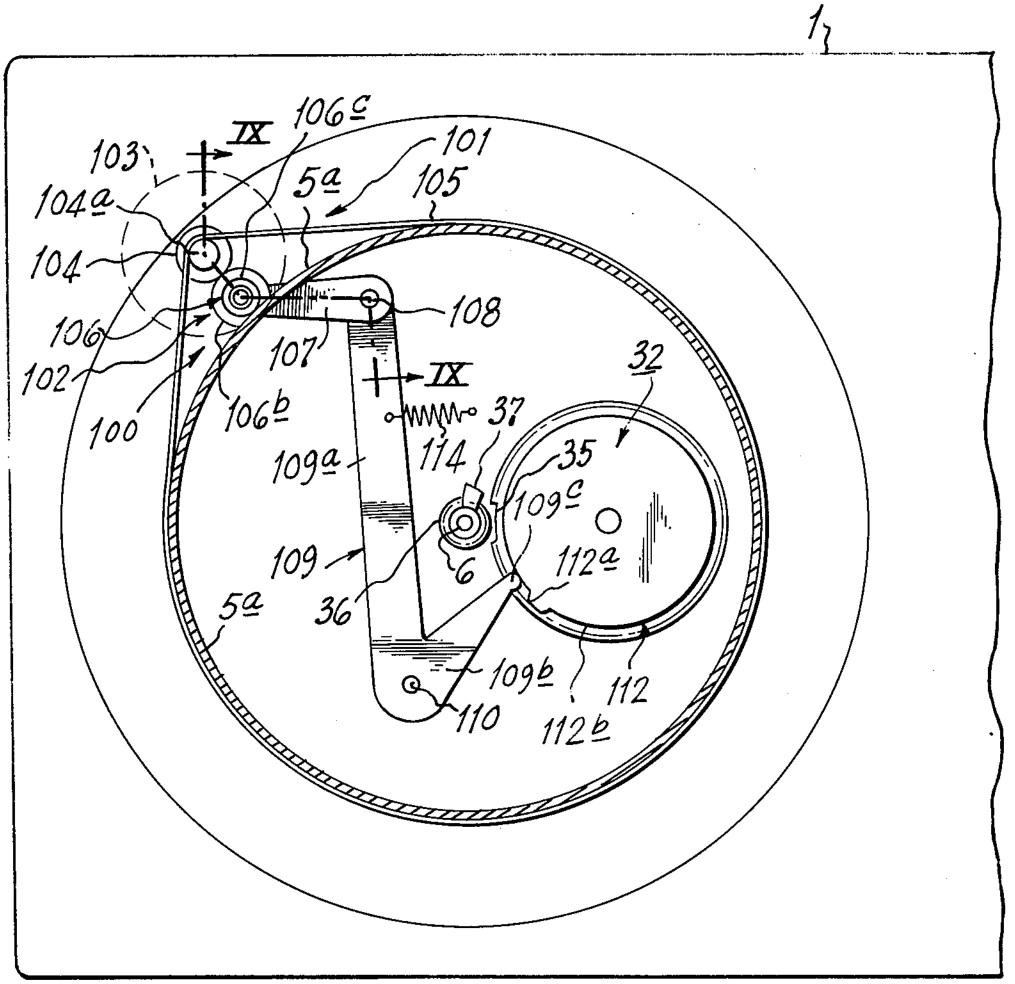
FIG. 8 is a view similar to that of FIG. 7, but showing the condition of the turntable drive assembly during the operation of the automatic function control mechanism of FIGS. 2–6.

In accordance with this invention, and as shown particularly on FIGS. 1,7 and 8, the turntable drive assembly 100 is endowed with the above desirable characteristics by being provided with a first transmission 101 connecting motor 103 with turntable 5 for rotating the latter during the playing of a record thereon, and with a second transmission 102 made operative during driving of the function control mechanism 9 by turntable 5 for further driving the latter from motor 103.

In order that signals will be reproduced with a good S/N ratio during the playing of a phonograph record on turntable 5, the transmission 101 is preferably of the belt drive type and is shown to include a pulley 104a secured on the shaft 103a of motor 103, and a flexible, elastic belt 105, for example, of rubber, which runs around pulley 104a and around a circular flange 5a (FIG. 9) which depends from turntable 5. Thus, when turntable 5 is driven by way of belt 105, as during the playing of a phonograph record, belt 105 absorbs any vibrations of motor 103 to ensure that turntable 5 is isolated from such vibrations and sounds will be reproduced with a good S/N ratio.

In order that a relatively large torque may be transmitted from motor 103 to turntable 5 when the latter drives function control mechanism 9, transmission 102 is shown to include a drive wheel or capstan 104 also secured on motor shaft 103a, for example, below pulley 104a (FIG. 9), and an idler wheel 106 engageable with drive wheel 104 and with flange 5a for transmitting rotation of drive wheel 104 to turntable 5. As shown, idler wheel 106 may have a stepped periphery providing relatively large and small-diameter portions 106b and 106c which are respectively engageable with drive wheel 104 and flanges 5a so that transmission 102, when operative, is effective to drive turntable 5 at the same rotational speed as the turntable is driven by transmission 101.

In order that transmission 102 will be operative to drive turntable 5 only when the latter drives function control mechanism 9, idler wheel 106 is rotatably mounted on a shaft 106a carried by one end of an arm 107 which has its other end pivotally connected, as at 108, to the free end of one arm 109a of a bellcrank lever 109. Bellcrank lever 109 is pivotally mounted between its arms 109a and 109b on a pivot 110 carried by frame 1, and arms 109a and 109b are angularly related, as shown on FIGS. 1, 7 and 8, so that, when bellcrank lever 109 is turned in the clockwise direction, idler wheel 106 is moved into engagement with drive wheel 104 and flange 5, and a cam follower constituted by the end portion 109c of bellcrank lever arm 109b is moved against a radial cam 112 which is rotatable with control member or gear 32 and may be formed integrally with the latter. The cam 112 is formed with a radially enlarged portion 112a (FIGS. 7 and 8) which is located in relation to gear 32 so that, in the initial position of the latter (FIG. 7), cam follower 109c engages radially enlarged portion 112a of cam 112 and turns bellcrank lever 109 in the counterclockwise direction against the force of a tension spring 114 connected between arm 109a and frame 1. Such counter-clockwise turning of bellcrank lever 109 moves idler wheel 106 to an inoperative position in which idler wheel 106 is spaced from drive wheel 104 and turntable flange 5a.

It will be apparent that, during the playing of a phonograph record on turntable 5, control gear 32 is retained in its initial position, whereby idler wheel 106 is held in its inoperative position, and turntable 5 is driven only through the belt 105 of transmission 101 for ensuring the reproduction of sounds with a good S/N ratio.

Figure 9:
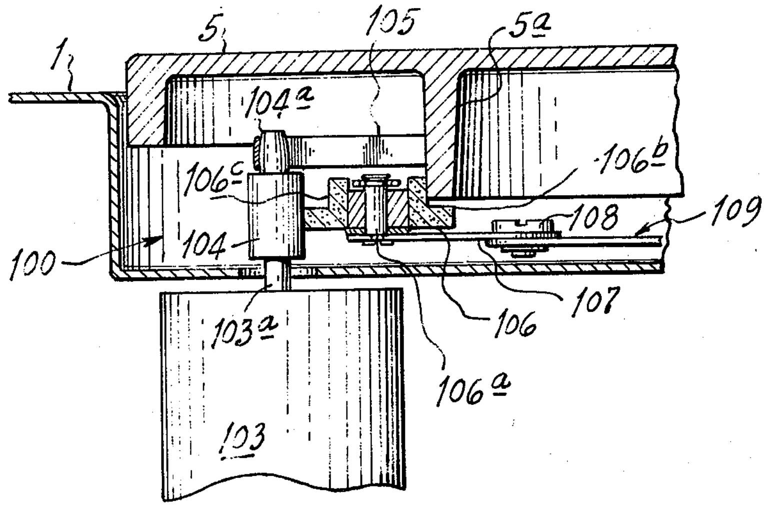
FIG. 9 is an enlarged detail sectional view taken along the line IX—IX on FIG. 8.

However, when automatic function control mechanism 9 is actuated, for example, by the shifting of detecting rod 41 in response to the completion of the playing of a record so that clutch device 34 is effective to initiate the driving of control gear 32 by pinion 36 turning with turntable 5, as described above, cam 112 turns with control gear 32 and cam follower 109*c* moves off radially enlarged cam portion 112*a* onto the remaining radially reduced portion 112*b* of cam 112. The engagement of cam follower 109*c* with the radially reduced portion 112*b* of cam 112 permits spring 114 to turn bellcrank lever 109 in the clockwise direction for engaging portions 106*b* and 106*c* of idler wheel 106 with drive wheel 104 and flange 5*a*, respectively (FIGS. 8 and 9). Thus, during the rotation of control gear 32 by pinion 36, turntable 5 is driven from motor 103 by way of transmission 102, as well as by way of transmission 101, to ensure that turntable 5 will be positively rotated against the increased resistance to its rotation interposed by the operation of function control mechanism 9.

Upon the completion of operation of function control mechanism 9, that is, upon the return of tone arm 3 to its rest position and the restoration of control gear 32 to its initial position, cam follower 109*c* again engages radially enlarged portion 112*a* of cam 112 with the result that idler wheel 106 is displaced to its inoperative position (FIG. 7). Therefore, in a subsequent record playing operation of the phonograph record player initiated by inward swinging of tone arm 3 from its rest position, as described above, the drive of turntable 5 is again effected only through transmission 101, that is, by way of belt 105.

In the phonograph record player described above and illustrated on the drawings, the turntable drive assembly 100 has been associated with an automatic function control mechanism 9 in the form of a mechanism for returning the tone arm 3 to its rest position at the completion of the playing of a phonograph record. However, it should be understood that the turntable drive assembly 100 according to this invention may be similarly provided in a phonograph record player having any other form of automatic function control mechanism, such as an automatic record changing mechanism, which is driven by the turntable during a record changing operation, for example, as disclosed in U.S. Pat. No. 3,288,471, issued Nov. 29, 1966.

Whatever the function of the phonograph record player controlled by the mechanism 9, the provision of the turntable drive assembly 100 according to this invention ensures that a good S/N ratio will be achieved in respect to the sounds reproduced during a record playing operation, and that a relatively high torque will be transmitted to the turntable for preventing stalling of the latter when the turntable drives the function control mechanism 9 during operation of the latter.

Although illustrative embodiments of this invention have been described in detail herein, it is to be understood that the invention is not limited to those precise embodiments, and that various changes and modifications may be effected therein by one skilled in the art without departing from the scope or spirit of the invention as defined in the appended claims.

What is claimed is:

1. In a phonograph record player having a frame, a turntable rotatably mounted on said frame for supporting a phonograph record during the playing thereof, and a function control mechanism driven by rotation of said turntable in response to actuation of said control mechanism; a drive mechanism for said turntable comprising an electrical motor; a first transmission means connecting said motor with said turntable for rotating said turntable during the playing of a phonograph record thereon, and a second transmission means made operative upon actuation of said function control mechanism for further connecting said motor with said turntable and for driving said turntable from said motor so as to prevent slowing of the rotation of said turntable when said turntable drives said control mechanism.

2. A phonograph record player according to claim 1; in which said first transmission means includes a pulley driven by said motor, and a flexible belt engaged by said pulley and extending around said turntable for driving the latter while isolating said turnable from vibrations of said motor.

3. A phonograph record player according to claim 2; in which said second transmission means includes a drive wheel also driven by said motor, an idler wheel engageable with said drive wheel and with said turntable for transmitting rotation of said drive wheel to said turntable, support means for said ilder wheel normally holding the latter in an inoperative position where said ilder wheel is spaced from at least one of said drive wheel and said turntable, and means acting on said support means for moving said idler wheel into engagement with said drive wheel and turntable during driving of said control mechanism by said turntable.

4. A phonograph record player according to claim 1; further comprising a tone arm assembly including a tone arm carrying a pickup with a stylus to track the groove of a phonograph record on said turntable, and means mounting said tone arm on said frame for lateral swinging movement across said turntable and for raising and lowering of the tone arm relative to said turntable between an elevated rest position outside the perimeter of said turntable and an inner position corresponding to the engagement of the pickup stylus in a final non-record groove portion of the record; and in which said function control mechanism is operative, when actuated and thereby driven by said turntable, to return said tone arm to said rest position thereof.

5. A phonograph record player according to claim 4; in which said control mechanism operative to return the tone arm to said rest position includes detecting means operative in response to the arrival of said tone arm at said inner position thereof, a rotatable control member rotated by said turntable through a complete revolution from an initial position in response to operation of said detecting means, and cooperatively engageable means connected with said rotatable control member and with said tone arm assembly, respectively, for returning said tone arm to said rest position in response to rotation of said control member from said initial position; and in which said rotatable control member has cam means rotatable therewith and acting on said support means for said idler wheel to hold the latter in said inoperative position thereof only when said rotatable control member is in said initial position.

6. A phonograph record player according to claim 5; in which said support means for the idler wheel includes lever means pivotally mounted on said frame, means mounting said idler wheel on said lever means, spring means connected with said lever means and urging the latter in a direction for moving said idler wheel into engagement with said drive wheel and turntable, and cam follower means on said lever means engaging said cam means and displacing said lever means in opposition to said spring means when said rotatable control member is in said initial position.

7. A phonograph record player according to claim 5; in which a pinion is rotatable with said turntable, said rotatable control member is constituted by a gear having peripheral teeth engageable by said pinion with a gap in said teeth facing toward said pinion in said initial position of said rotatable control member, said rotatable control member has clutch means thereon movable between engaged and disengaged conditions, said pinion has a drive member rotatable therewith and operable to act against said clutch means in said engaged condition of the latter for incremental movement of said rotatable control member from said initial position and thereby meshing said pinion with said teeth of the gear, and said detecting means is operative to shift said clutch means from its disengaged condition to said engaged condition.

8. A phonograph record player according to claim 7; in which said detecting means includes a rod engageable at one end with said clutch means for shifting the latter from said disengaged condition to said engaged condition, and said tone arm assembly includes means acting on the other end of said rod in said inner position of the tone arm for causing said one end of the rod to engage and shift said clutch means.

9. A phonograph record player according to claim 5; further comprising switch means having ON and OFF conditions for rendering said motor operative and inoperative, respectively, switch operating means for establishing said OFF condition of the switch means when said tone arm is initially in said rest position and for establishing said ON condition of the switch means in response to at least a predetermined lateral swinging movement of said tone arm from said rest position, and means for causing said switch operating means to reestablish said OFF condition of the switch means upon the return of said rotatable control member to said initial position of the latter.

10. A phonograph record player according to claim 1; in which said motor has a shaft which is rotated upon operation of said motor, said first transmission means includes a pulley secured on said shaft and a flexible belt running around said pulley and around a circular flange on said turntable for driving the latter in response to operation of said motor while isolating said turntable from vibrations of said motor, and said second transmission means includes a drive wheel also secured on said shaft, an idler wheel engageable with said drive wheel and with said flange on the turntable for transmitting rotation to the latter from said drive wheel, movable support means for said idler wheel, and means acting on said support means for holding said idler wheelin wheel in inoperative position spaced from at least one of said drive wheel and said flange of the turntable except during driving of said control mechanism by said turntable.

11. A phonograph record player according to claim 10; in which said idler wheel has a stepped periphery providing relatively large- and small-diameter portions, and said large-and small-diameter portions of the idler wheel are respectively engageable with said drive wheel and said flange of the turntable.

12. A phonograph record player according to claim 10; in which said function control mechanism includes actuating means operable to initiate a respective function of the record player, and a rotatable control member rotated through a complete revolution from an initial position by said turntable in response to operation of said actuating means; and in which said means acting on said support means includes cam means rotatable with said control member and disposing said support means for holding the idler wheel in said inoperative position only when said rotatable control member is in said initial position of the latter.

13. A phonograph record player according to claim 12; in which said support means for the idler wheel includes lever means pivotally mounted on said frame, means mounting said idler wheel on said lever means, spring means connected with said lever means and urging the latter in a direction for moving said idler wheel into engagement with said drive wheel and turntable, and cam follower means on said lever means engaging said cam means and displacing said lever means in opposition to said spring means when said rotatable control member is in said initial position.

14. A phonograph record player according to claim 13; in which a pinion is rotatable with said turntable, said rotatable control member is constituted by a gear having peripheral teeth engageable by said pinion with a gap in said teeth facing toward said pinion in said initial position of said rotatable control member, said rotatable control member has clutch means thereon movable between engaged and disengaged conditions, said pinion has a drive member rotatable therewith and operable to act against said clutch means in said engaged condition of the latter for incremental movement of said rotatable control member from said initial position and thereby meshing said pinion with said teeth of the gear, and said actuating means is operative to shift said clutch means from its disengaged condition to said engaged condition.

* * * * *